(12) United States Patent
Yamashita

(10) Patent No.: US 7,559,389 B2
(45) Date of Patent: Jul. 14, 2009

(54) FUEL CELL EQUIPPED VEHICLE

(75) Inventor: Masayoshi Yamashita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 397 days.

(21) Appl. No.: 10/528,558

(22) PCT Filed: Oct. 2, 2003

(86) PCT No.: PCT/IB03/04341

§ 371 (c)(1),
(2), (4) Date: Mar. 21, 2005

(87) PCT Pub. No.: WO2004/030969

PCT Pub. Date: Apr. 15, 2004

(65) Prior Publication Data

US 2006/0021805 A1 Feb. 2, 2006

(30) Foreign Application Priority Data

Oct. 3, 2002 (JP) ............................. 2002-290951

(51) Int. Cl.
*H01M 8/04* (2006.01)
(52) U.S. Cl. .................... 180/65.3; 180/65.1; 180/68.5; 180/68.4
(58) Field of Classification Search ................. 180/65.3, 180/65.1, 68.5, 68.4
See application file for complete search history.

(56) References Cited

U.S. PATENT DOCUMENTS

| | | | | |
|---|---|---|---|---|
| 5,193,635 | A * | 3/1993 | Mizuno et al. ............. | 180/65.3 |
| 5,641,031 | A * | 6/1997 | Riemer et al. ............. | 180/65.3 |
| 5,704,644 | A | 1/1998 | Jaggi | |
| 6,378,637 | B1 * | 4/2002 | Ono et al. .................. | 180/65.3 |
| 6,598,691 | B2 * | 7/2003 | Mita et al. ................. | 180/65.1 |
| 6,874,588 | B2 * | 4/2005 | Kato et al. ................. | 180/65.3 |
| 6,902,020 | B2 * | 6/2005 | Kronner et al. ............ | 180/68.5 |
| 6,907,947 | B2 * | 6/2005 | Morita et al. .............. | 180/65.1 |
| 6,923,281 | B2 * | 8/2005 | Chernoff et al. ........... | 180/65.2 |
| 6,978,855 | B2 * | 12/2005 | Kubota et al. .............. | 180/65.3 |

(Continued)

FOREIGN PATENT DOCUMENTS

DE 100 10 398 A1 9/2001

(Continued)

OTHER PUBLICATIONS

Partial Translation of Korean Office Action, Korean Patent Application No. 10-2005-7005811, issued Jan. 31, 2006.

(Continued)

*Primary Examiner*—Christopher Ellis
*Assistant Examiner*—Cynthia F. Collado
(74) *Attorney, Agent, or Firm*—Kenyon & Kenyon LLP

(57) ABSTRACT

In a fuel cell equipped vehicle (10), a fuel cell (30) is accommodated in a first recess portion (22) which forms part of a floor panel (20) of a vehicle passenger room (R1) and which is provided below front seats (60), with an upper portion of the fuel cell (30) protruding above a reference plane (20a) of the floor panel (20). That is, the fuel cell (30) is disposed inside the vehicle passenger room (R1) and is protected from dust or slop. Accordingly, maintenance of the fuel cell (30) is easier to carry out in comparison with a case where it is exposed to dust or slop.

20 Claims, 5 Drawing Sheets

U.S. PATENT DOCUMENTS

| | | | |
|---|---|---|---|
| 7,198,124 B2 * | 4/2007 | Amori et al. | 180/68.5 |
| 7,219,758 B2 * | 5/2007 | Guidry et al. | 180/65.3 |
| 2002/0060100 A1 | 5/2002 | Nagura et al. | |
| 2005/0224265 A1 * | 10/2005 | Mizuno | 180/65.3 |

FOREIGN PATENT DOCUMENTS

| | | |
|---|---|---|
| EP | 0 677 417 A1 | 10/1995 |
| EP | 0 1 115 165 A2 | 7/2001 |
| JP | 02174503 | 7/1990 |
| JP | 03109126 | 5/1991 |
| JP | 04266576 | 9/1992 |
| JP | 11113105 | 4/1999 |
| JP | 2000233648 | 8/2000 |
| JP | 2000238541 | 9/2000 |
| JP | 2001 063386 A | 3/2001 |
| JP | 2001/113960 | 4/2001 |
| JP | 2001/1113960 | 4/2001 |
| JP | 2001-253248 A | 9/2001 |
| JP | 2001-268720 | 9/2001 |
| JP | 20002141079 | 5/2002 |
| JP | 2002165309 | 6/2002 |
| JP | 2003017084 | 1/2003 |
| WO | WO 02/36379 | 5/2002 |

OTHER PUBLICATIONS

Korean Office Action, Korean Patent Application No. 101-2005-7005811, issued Jan. 31, 2006.

Japanese Language Version of Chinese Office Action, Appln. No. 2005-335736 dated Dec. 4, 2007.

English Translation of Japanese Office Action, Appln. No. 2005-335736 dated Dec. 4, 2007.

Japanese Version of Japanese Official Action (Appln. No. 2002-290951) issued Sep. 20, 2005.

Partial English Translation of the Japanese Official Action (Appln. No. 2002-290951) issued Sep. 20, 2005.

* cited by examiner

FUEL CELL EQUIPPED VEHICLE

This is a 371 of PCT/IB2003/004341 filed 2 Oct. 2003, which claims priority to Japanese Patent Application No. 2002-290951 filed 3 Oct. 2002, the contents of which are incorporated herein by reference in their entirety.

FIELD OF THE INVENTION

The invention relates to a fuel cell equipped vehicle.

BACKGROUND OF THE INVENTION

Heretofore, various fuel cell equipped vehicles wherein a fuel cell is so disposed as to prevent to the utmost a reduction in space of a cabin have been proposed. For instance, Japanese Patent Application Laid-Open No. 2001-268720 discloses a fuel cell equipped vehicle wherein a fuel cell, a hydrogen occlusion alloy tank, fuel cell auxiliaries, and a battery unit are disposed in their horizontal states directly below a cabin floor between front wheels and rear wheels.

According to Japanese Patent Application Laid-Open No. 2001-268720, however, the fuel cell is disposed directly below a floor of the cabin, namely, outside a vehicle passenger room. Therefore, the fuel cell is exposed to dust or slop while the vehicle is running. As a result, maintenance of the fuel cell is troublesome in some cases.

DISCLOSURE OF THE INVENTION

It is an object of the invention to provide a fuel cell equipped vehicle wherein maintenance of a fuel cell is easy to carry out.

A fuel cell equipped vehicle in accordance with a first aspect of the invention is provided with a fuel cell that generates electricity through a reaction of fuel gas and oxidation gas, and the fuel cell is disposed in a vehicle passenger room. This fuel cell is disposed in the vehicle passenger room and is therefore protected from dust or slop. Accordingly, maintenance of the fuel cell is easier to carry out in comparison with a case where the fuel cell is exposed to dust or slop.

The "fuel cell" may be designed to supply electric power to a motor for driving the vehicle. Alternatively, the "fuel cell" may be designed to supply electric power to other on-vehicle units (e.g., an air conditioner, an audio-visual equipment, a navigation system, a lighting fixture, and the like). Further, it is preferable that the "vehicle passenger room" be equipped with a cooling/heating system.

In a fuel cell equipped vehicle in accordance with a second aspect of the invention, the aforementioned first aspect is modified such that the fuel cell is disposed in a fuel cell recess portion of a floor panel. In this construction, the fuel cell can be accommodated without protruding very far above a reference plane (a plane including positions corresponding to feet of passengers) of the floor panel. In this case, it is also appropriate to prevent the passengers from feeling a sense of incongruity by covering the floor panel with a cover (e.g., a carpet or the like). This fuel cell recess portion may be so formed as to be interposed between a pair of underfloor reinforcements constituting a monocoque structure of the fuel cell equipped vehicle.

In a fuel cell equipped vehicle in accordance with a third aspect of the invention, the aforementioned first or second aspect is modified such that the vehicle comprises a storage battery for storing electric energy, and that the storage battery is disposed in the vehicle passenger room. In this construction, the storage battery is also protected from dust or slop. Therefore, maintenance of the storage battery is easier to carry out in comparison with a case where the storage battery is exposed to dust or slop.

The "storage battery" may be designed to supply electric power to a motor for driving the vehicle. Alternatively, the "storage battery" may be designed to supply electric power to other on-vehicle units (e.g., an air conditioner, an audio-visual equipment, a navigation system, a lighting fixture, and the like). Further, the "storage battery" may be a secondary battery (e.g., a nickel-hydrogen secondary battery, a nickel-cadmium secondary battery, a lithium-hydrogen secondary battery, a lead-acid battery, or the like) that stores electric energy through an electrochemical reaction. Alternatively, the "storage battery" may be a capacitor that directly stores' electric energy.

In a fuel cell equipped vehicle in accordance with a fourth aspect of the invention, the aforementioned third aspect is modified such that the storage battery is disposed in a storage battery recess portion of the floor panel. In this construction, the storage battery can be accommodated without protruding very far above the reference plane of the floor panel. In this case, it is also appropriate to prevent passengers from feeling a sense of incongruity by covering the floor panel with a cover (e.g., a carpet or the like). The storage battery recess portion may be accommodated in a staged recess portion which forms part of the floor panel and which is provided at a position corresponding to feet of passengers seated in rear seats, with an upper face of the storage battery being substantially coincident with the reference plane of the floor panel.

In a fuel cell equipped vehicle in accordance with a fifth aspect of the invention, the aforementioned third aspect is modified such that the fuel cell is disposed below the front seats, and that the storage battery is disposed at a position corresponding to feet of passengers seated in the rear seats. In this construction, the vehicle has a low center of gravity and is suitably balanced in a longitudinal direction thereof. As a result, the vehicle demonstrates good running stability. In this case, both the fuel cell and the storage battery may be disposed with their longitudinal directions being coincident with a lateral direction of the vehicle. In this construction, the front and rear seats are longer in the lateral direction of the vehicle than in the longitudinal direction of the vehicle. Thus, the fuel cell can be easily disposed below the front seats, while the storage battery can be easily disposed at a position corresponding to feet of passengers seated in the rear seats. The fuel cell may be so formed as to be higher than the storage battery. That is, since the fuel cell is disposed below the front seats, there is little possibility of a problem being caused even if the fuel cell is great in height. On the other hand, since the storage battery is disposed at the position corresponding to feet of passengers seated in the rear seats, it is preferable that the storage battery be lowered in height.

In a fuel cell equipped vehicle in accordance with a sixth aspect of the invention, the aforementioned third aspect is modified such that the fuel cell is disposed at the position corresponding to feet of passengers seated in the rear seats, and that the storage battery is disposed below the front seats.

In a fuel cell equipped vehicle in accordance with a seventh aspect of the invention, any one of the aforementioned first to sixth aspects is modified such that the vehicle further comprises a fuel gas feed unit for supplying the fuel cell with fuel gas, and that the fuel gas feed unit is disposed outside the vehicle passenger room. Thus, fuel gas seldom enters the vehicle passenger room from the fuel gas feed unit. In this case, the fuel gas feed unit may be disposed behind the rear seats. This construction is preferred from the standpoint of the balance of weight.

In a fuel cell equipped vehicle in accordance with an eighth aspect of the invention, any one of the aforementioned first to seventh aspects is modified such that the vehicle further comprises a motor for driving at least either front wheels or rear wheels, and that electric power of at least one of the fuel cell and the storage battery is supplied to the motor. In this construction, the invention can be suitably applied to a vehicle that runs with its motor being supplied with electric power of a fuel cell and a storage battery.

In a fuel cell equipped vehicle in accordance with a ninth aspect of the invention, any one of the aforementioned first to eighth aspects is modified such that the vehicle further comprises fuel cell auxiliaries constituting auxiliaries of the fuel cell, and that the fuel cell auxiliaries are disposed in a vehicle front room. The fuel cell auxiliaries may be disposed around the fuel cell. Furthermore, the fuel cell auxiliaries may be disposed on or below the floor panel.

DETAILED DESCRIPTION OF PREFERRED EMBODIMENT

Figure 1:
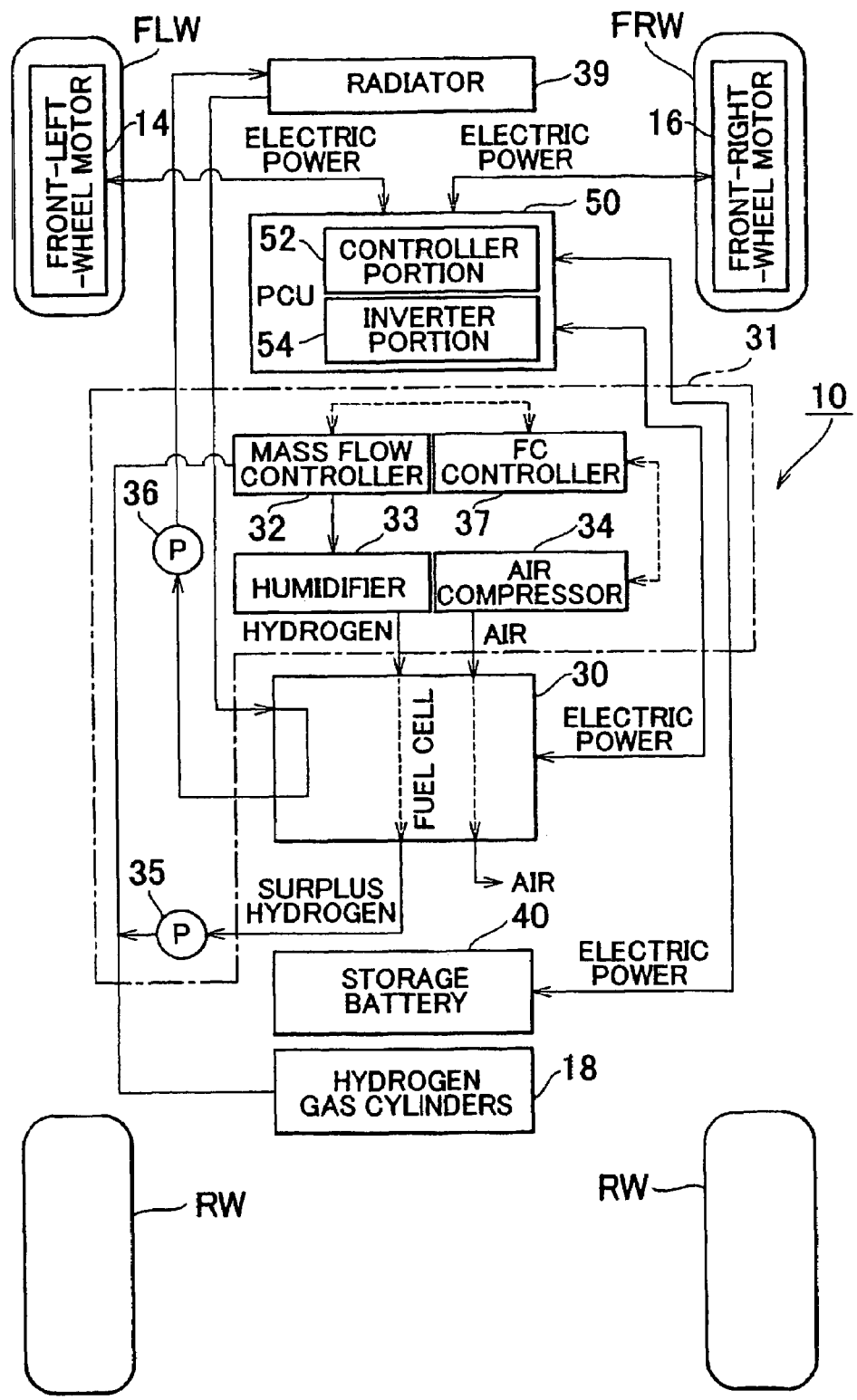
FIG. 1 is a block diagram of a fuel cell equipped vehicle.
Figure 2:
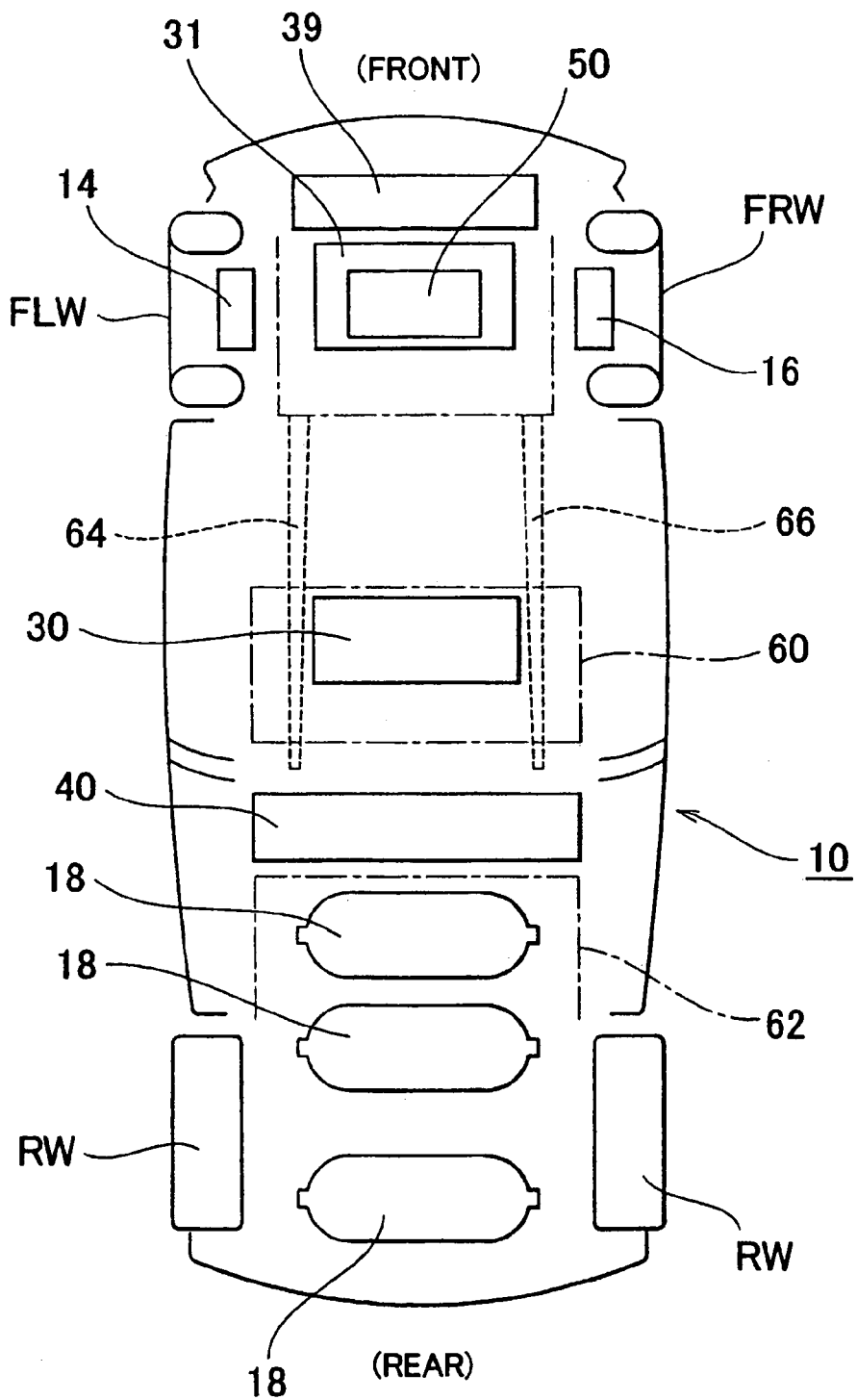
FIG. 2 is a schematic plan view of the fuel cell equipped vehicle.
Figure 3:
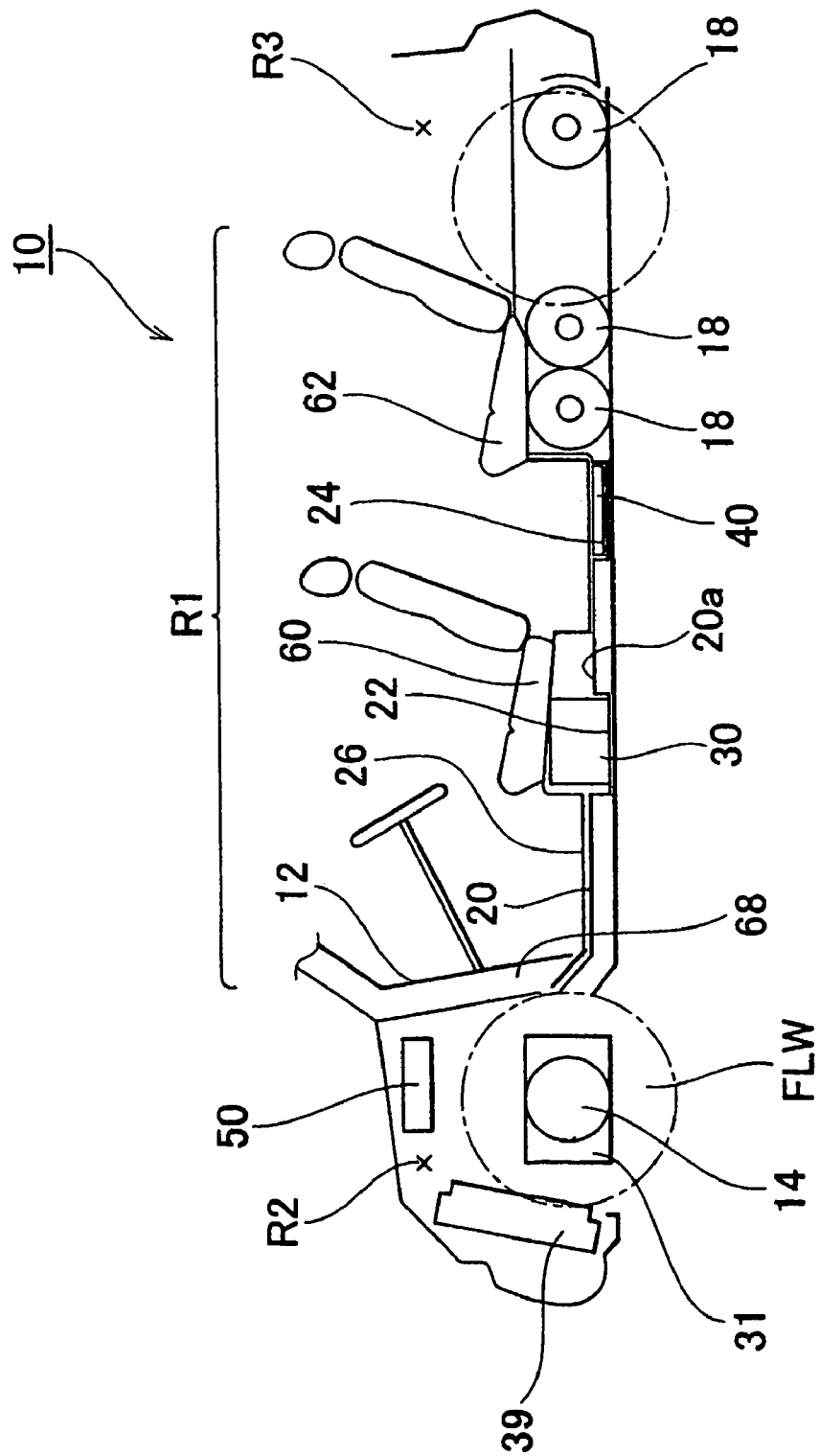
FIG. 3 is a schematic cross-sectional view of the fuel cell equipped vehicle.
Figure 4A:
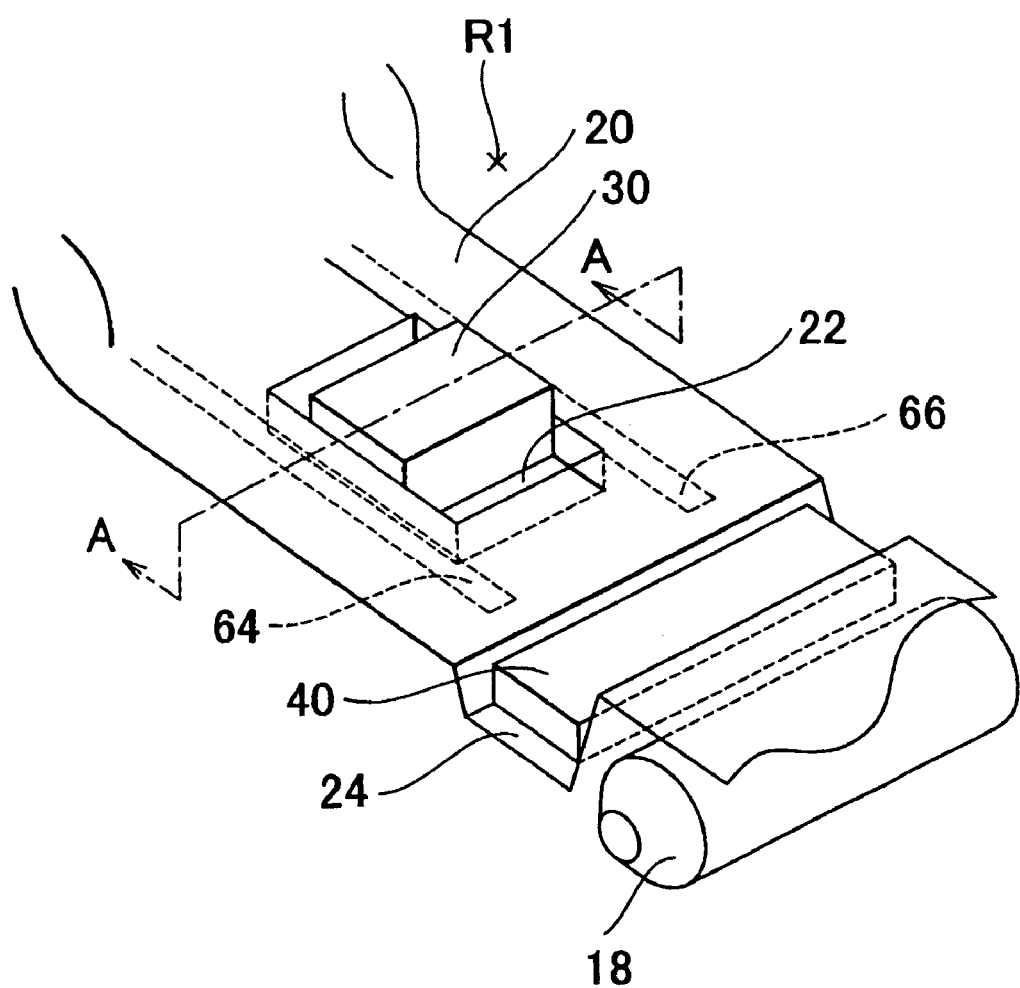
FIG. 4A is a perspective view illustrating how the fuel cell and a storage battery are arranged on a floor panel.
Figure 4B:
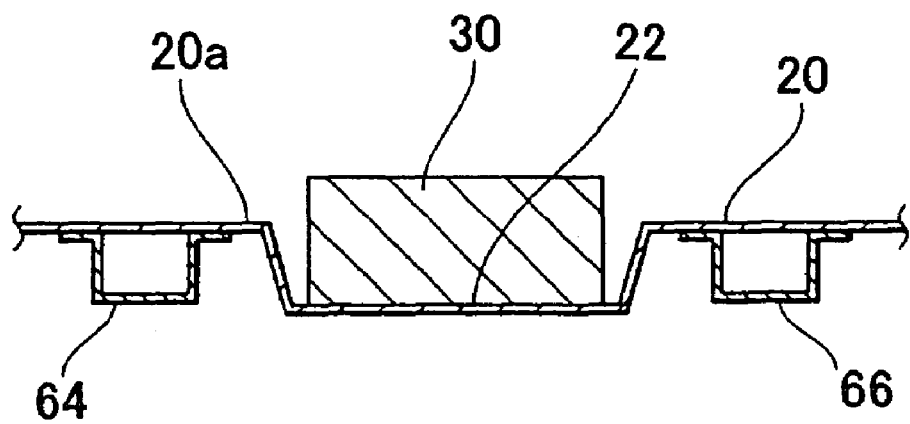
FIG. 4B is a cross-sectional view which is taken along a line A-A of FIG. 4A and which illustrates how the fuel cell and the storage battery are arranged on the floor panel.

In order to further elucidate the invention, a preferred embodiment thereof will be described hereinafter with reference to the drawings. FIG. 1 is a block diagram of a fuel cell equipped vehicle. FIG. 2 is a schematic plan view of the fuel cell equipped vehicle of this embodiment. FIG. 3 is a schematic cross-sectional view of the fuel cell equipped vehicle. FIG. 4 illustrates how the fuel cell and a storage battery are arranged on a floor panel. FIG. 4A is a perspective view, and FIG. 4B is a cross-sectional view taken along a line A-A of FIG. 4A.

As illustrated in FIG. 1, a fuel cell equipped vehicle 10 of this embodiment mainly includes a front-left-wheel motor 14, a front-right-wheel motor 16, hydrogen gas cylinders 18, a fuel cell 30, a storage battery 40, and a power control unit (hereinafter referred to as "PCU") 50. As illustrated in FIG. 3, the fuel cell equipped vehicle 10 includes a vehicle passenger room R1, a vehicle front room R2, and a vehicle rear room R3. In the vehicle passenger room R1, front seats 60 (a driver seat and an assistant driver seat) and rear seats 62 are arranged. The vehicle front room R2 is provided on the side of front wheels, is separated from the vehicle passenger room R1 by a dash panel 12, and serves as an engine room or the like. The vehicle rear room R3 is provided on the side of rear wheels, and serves as a luggage room or the like. The vehicle passenger room R1 can be heated and cooled by an air conditioner (not shown).

In the fuel cell equipped vehicle 10 of this embodiment, a space formed therein is divided into predetermined spaces, namely, the vehicle passenger room R1, the vehicle front room R2, and the vehicle rear room R3. However, since there are many vehicles that are different in configuration from the vehicle 10 employed in this embodiment, a vehicle of any configuration can be employed in the invention as long as the fuel cell 30 can be mounted therein. In this case, the vehicle passenger room R1 can be defined as a space which is above the floor panel 20 in a vertical direction and which is from a dash panel to a far rear end of a seat in a longitudinal direction. However, some vehicles of a certain configuration dispense with both or one of the vehicle front room R2 and the vehicle rear room R3. The vehicle front room R2 is defined as a predetermined space which is located at least outside the vehicle passenger room R1 and which is provided in front of the vehicle passenger room R1. The vehicle rear room R3 is defined as a predetermined space which is located at least outside the vehicle passenger room R1 and which is provided behind the vehicle passenger room R1.

The front-left-wheel motor 14 is a in-wheel motor that is mounted in a front-left wheel FLW, and serves to rotate an axle of the front-left wheel FLW. The front-right-wheel motor 16 is a in-wheel motor that is mounted in a front-right wheel FRW, and serves to rotate an axle of the front-right wheel FRW. Because the front-left-wheel motor 14 and the front-right-wheel motor 16 are separated from each other, a relatively large space is formed between both the motors 14 and 16 in the vehicle front room R2. Disposed in this space are fuel cell auxiliaries 31, which will be described later.

Each of the hydrogen gas cylinders 18 is a container in which hydrogen gas as a fuel gas to be supplied to the fuel cell 30 is compressed and accumulated at a high pressure. In this embodiment, the hydrogen gas cylinders 18 are arranged in parallel. These hydrogen gas cylinders 18 are disposed below the floor panel 20 for separating an inner space (inside the vehicle) and an outer space (outside the vehicle) of the vehicle passenger room R1 from each other. Namely, the hydrogen gas cylinders 18 are disposed in the outer space (outside the vehicle).

The fuel cell 30 is a known fuel cell of solid polyelectrolyte type, has a stack structure established by laminating a plurality of single cells as constitutional units, and functions as a high-voltage power source (several hundred V). In each of the single cells constituting the fuel cell 30, as illustrated in FIG. 1, hydrogen gas (fuel gas), which has flown from the hydrogen gas cylinder 18 and whose pressure and flow rate have been adjusted by a mass flow controller 32, is humidified by a humidifier 33 and is then supplied to an anode. Compressed air (oxidation gas), whose pressure has been adjusted by an air compressor 34, is supplied to a cathode. With the progress of a predetermined electrochemical reaction, an electromotive force is generated. That is, hydrogen is separated into protons and electrons in the anode. The protons separated from hydrogen in the anode are conveyed through a solid polyelectrolyte membrane and reach the cathode. At the same time, the electrons separated from hydrogen in the anode pass through an electric wire connected via a load, and reach the cathode. Oxygen is coupled with the electrons and the protons in the cathode, so that water is produced. With the progress of the electrochemical reaction described hitherto, an electromotive force is generated.

As illustrated in FIGS. 3 and 4, the fuel cell 30 is accommodated in a first recess portion 22 which forms part of the floor panel 20 of the vehicle passenger room R1 and which is provided below the front seats 60, with an upper portion of the fuel cell 30 protruding above a reference plane 20a of the floor panel 20. That is, the fuel cell 30 is disposed inside the vehicle passenger room R1. Because the vehicle passenger room R1 is equipped with a cooling/heating system, the fuel cell 30 may also be regarded as being disposed in an air conditioned environment. Further, the fuel cell 30 is disposed with its longitudinal direction being coincident with a lateral direction of the vehicle. In addition, the first recess portion 22 for accommodating the fuel cell 30 is so formed as to be interposed between a pair of underfloor reinforcements 64 and 66, which constitute a monocoque structure of the fuel cell equipped vehicle 10 (see FIG. 4B).

The fuel cell auxiliaries 31 include a hydrogen gas circulation pump 35, a water pump 36, an FC controller 37 (FC is an abbreviation of "fuel cell") and the like, as well as the above-mentioned components, namely, the mass flow controller 32, the humidifier 33, and the air compressor 34. The hydrogen gas circulation pump 35 resupplies to the fuel cell 30 unreacted hydrogen gas that has been discharged therefrom. The water pump 36 causes coolant for cooling the fuel cell 30 to circulate between the fuel cell 30 and a radiator 39. The FC controller 37 outputs control signals for controlling amounts of gas to be supplied to the mass flow controller 32 and the air compressor 34, on the basis of a pedal position detected by an accelerator pedal sensor (not shown) and values detected by various sensors. These components are disposed in the vehicle front room R2 while being accommodated in an auxiliary box. The fuel cell auxiliaries 31 are disposed between the front-left-wheel motor 14 and the front-right-wheel motor 16 in the vehicle front room R2. The fuel cell auxiliaries 31 may be supplied with electric power from a low-voltage (e.g., 12V) battery (not shown). Alternatively, the fuel cell auxiliaries 31 may be supplied with electric power that has been lowered in voltage by the PCU 50 after being delivered from the fuel cell 30 and the storage battery 40.

The storage battery 40 has a structure established by connecting in series a plurality of known nickel-hydrogen storage batteries, and functions as a high-voltage power source (several hundred V). By being controlled by the PCU 50, the storage battery 40 drives the motors 14 and 16 during takeoff of the vehicle, recovers regenerative power from the motors 14 and 16 during deceleration and regeneration of the vehicle, assists the motors 14 and 16 during acceleration of the vehicle, and is charged by the fuel cell 30 in accordance with a load. As illustrated in FIGS. 3 and 4, the storage battery 40 is accommodated in a second recess portion 24 which forms part of the floor panel 20 and which is provided at a position corresponding to feet of passengers seated in the rear seats 62, with an upper face of the storage battery 40 being substantially coincident with the reference plane 20a of the floor panel 20. That is, the storage battery 40 is disposed inside the vehicle passenger compartment R1. Further, the storage battery 40 is disposed with its longitudinal direction being coincident with the lateral direction of the vehicle. As long as the storage battery 40 can be charged with electricity and can discharge electricity, it may be of any type. For instance, the storage battery 40 may be a nickel-cadmium secondary battery, a lithium-hydrogen secondary battery, a lead-acid battery, a capacitor or the like, instead of a nickel-hydrogen secondary battery.

The floor panel 20 is entirely covered with a floor cover 26 (see FIG. 3) with the fuel cell 30 and the storage battery 40 being accommodated in the first recess portion 22 and the second recess portion 24 respectively. Because the floor cover 26 exists, passengers can enter the vehicle passenger room R1 without feeling a sense of incongruity.

The PCU 50 is disposed in the vehicle front room R2, and is provided with a controller portion 52 and an inverter portion 54. The controller portion 52 is constructed as a logic circuit including a microcomputer as a main component. The inverter portion 54 converts high-voltage direct current flowing through the fuel cell 30 and the storage battery 40 and alternating current flowing through the drive motors 14 and 16 into each other. In accordance with loads applied to the motors 14 and 16 and an amount of electricity stored in the storage battery 40, the controller portion 52 of the PCU 50 performs a control operation of supplying the motors 14 and 16 and the storage battery 40 with electric power generated by the fuel cell 30 or a control operation of supplying the drive motors 14 and 16 with electric power stored in the storage battery 40. More specifically, when large loads are applied to the motors 14 and 16, for example, during acceleration or the like of the vehicle, electric power generated by the fuel cell 30 and electric power stored in the storage battery 40 are supplied to the motors 14 and 16. Further, during deceleration, braking or the like of the vehicle, regenerative electric power obtained from the motors 14 and 16 is supplied to the storage battery 40.

In the fuel cell equipped vehicle 10 constructed as described above according to this embodiment, the fuel cell 30 and the storage battery 40 are disposed on the floor panel 20 of the vehicle passenger room R1, namely, inside the vehicle passenger room R1, and are therefore protected from dust or slop. Accordingly, maintenance of the fuel cell 30 and the storage battery 40 is easier to carry out in comparison with a case where they are exposed to dust or slop. Further, the fuel cell 30 and the storage battery 40 are disposed in the first recess portion 22 and the second recess portion 24, which form part of the floor panel 20. Therefore, the fuel cell 30 and the storage battery 40 can be accommodated without protruding very far above the reference plane 20a of the floor panel 20.

In addition, the fuel cell 30 and the storage battery 40 are relatively heavy components, and are disposed below the front seats 60 and at the feet of passengers seated in the rear seats 62, respectively. Thus, the vehicle has a low center of gravity and is suitably balanced in a longitudinal direction thereof. As a result, the vehicle demonstrates good running stability. In this case, the fuel cell 30 and the storage battery 40 are disposed with their longitudinal directions being coincident with the lateral direction of the vehicle, in consideration of the fact that the front seats 60 and the rear seats 62 are longer in the lateral direction of the vehicle than in the longitudinal direction of the vehicle. The storage battery 40 is lower than the fuel cell 30, and the upper face of the storage battery 40 substantially coincides with the reference plane 20a of the floor panel 20. Therefore, passengers seated in the rear seats 62 hardly feel a sense of incongruity at their feet.

Furthermore, the hydrogen gas cylinders 18 as a fuel gas feed unit are disposed below the floor panel 20, namely, outside the vehicle passenger room R1. Therefore, hydrogen gas seldom enters the vehicle passenger room R1. Because the hydrogen gas cylinders 18 are disposed behind the rear seats 62, the weight of the vehicle is suitably balanced in the longitudinal direction thereof, and an operation of filling hydrogen can be performed in a rear part of the vehicle.

In this embodiment, the vehicle front room R2 is ample in space. Therefore, it is also possible to displace the front seats 60 slightly forwards so as to widen the space of the vehicle passenger room R1. In this case, feet of passengers who sit down on or stand up from the front seats 60 may hit a lower portion 68 of a front body pillar (see FIG. 3). Therefore, it is preferable to ensure accessibility of the vehicle by setting a height thereof such that passengers can at least stand up in the vehicle passenger room R1 with a slight stoop.

It is too obvious to mention that the invention is not limited to the aforementioned embodiment at all but can be implemented in various manners without departing from a technical scope thereof.

For instance, according to the aforementioned embodiment, the fuel cell 30 and the storage battery 40 are disposed on the front and rear sides respectively in the vehicle passenger room R1. It is also appropriate, however, that the fuel cell 30 be disposed on the rear side in the vehicle passenger room R1 and that the storage battery 40 be disposed on the front side in the vehicle passenger room R1.

Further, according to the aforementioned embodiment, the fuel cell auxiliaries 31 are disposed in the vehicle front room R2. It is also appropriate, however, that the fuel cell auxiliaries 31 be disposed around the fuel cell 30 (e.g., in front of or on the right or left of the fuel cell 30). In this case, the fuel cell auxiliaries 31 may be disposed on the floor panel 20, namely, inside the vehicle passenger room R1 so as to be protected from dust or slop. Alternatively, the fuel cell auxiliaries 31 may be disposed below the floor panel 20, namely, outside the vehicle passenger room R1 so as to prevent dispersion of noise during operation or the like.

Further, according to the aforementioned embodiment, the hydrogen gas cylinders 18 are adopted as a fuel gas feed unit. However, it is also possible to adopt a tank utilizing a hydrogen occlusion alloy which stores hydrogen gas at a temperature equal to or lower than a predetermined hydrogen storage temperature and which discharges hydrogen gas at a temperature higher than the predetermined hydrogen storage temperature. Alternatively, it is also possible to adopt a reformer which produces hydrogen rich gas through a reaction of hydrocarbon type fuel and water.

Still further, according to the aforementioned embodiment, in-wheel motors are adopted as the front-wheel drive motors. It is also appropriate that a single motor rotationally drive the front-left and front-right wheels. Alternatively, it is also appropriate that the vehicle be designed as a rear-wheel-drive vehicle or an all-wheel-drive vehicle instead of a front-wheel-drive vehicle.

Still further, the aforementioned embodiment adopts an arrangement wherein both the fuel cell 30 and the storage battery 40 can be utilized as drive sources of the motors 14 and 16 (including, from the standpoint of control, cases where both the fuel cell 30 and the storage battery 40 drive the motors 14 and 16 and where only one of the fuel cell 30 and the storage battery 40 drives the motors 14 and 16). It is also appropriate, however, that only one of the fuel cell 30 and the storage battery 40 be available as a drive source for the motors 14 and 16. For example, it is also appropriate that one of the batteries be available as a drive source for the motors 14 and 16 and that the other battery be available as a power source for other units (e.g., auxiliaries). Alternatively, it is also appropriate that something other than the batteries 30 and 40 be provided as a drive source for the motors 14 and 16, and that at least one of the batteries 30 and 40 serve to assist the drive source. As described hitherto, it is appropriate that the motors 14 and 16 be so designed as to utilize at least one of the fuel cell 30 and the storage battery 40 as a drive source.

In a fuel cell equipped vehicle 10, a fuel cell 30 is accommodated in a first recess portion 22 which forms part of a floor panel 20 of a vehicle passenger room R1 and which is provided below front seats 60, with an upper portion of the fuel cell 30 protruding above a reference plane 20a of the floor panel 20. That is, the fuel cell 30 is disposed inside the vehicle passenger room R1 and is protected from dust or slop. Accordingly, maintenance of the fuel cell 30 is easier to carry out in comparison with a case where it is exposed to dust or slop.

The invention claimed is:

1. A vehicle comprising:
    a floor panel that separates an inside of a vehicle, which is a vehicle passenger room, from an outside of the vehicle, the vehicle passenger room is equipped with a cooling/heating system; and
    a fuel cell that generates electricity through a reaction of fuel gas and oxidation gas, wherein the fuel cell is disposed on the floor panel so as to be in the vehicle passenger room in a temperature conditioned environment, wherein the fuel cell is disposed in a fuel cell recess portion of the floor panel.

2. The vehicle according to claim 1, wherein the fuel cell recess portion is so formed as to be interposed between a pair of underfloor reinforcements.

3. The vehicle according to claim 1, further comprising a storage battery for storing electric energy, wherein the storage battery is disposed in the vehicle passenger room.

4. The vehicle according to claim 1, wherein the fuel cell is so formed as to be higher than the storage battery.

5. The vehicle according to claim 1, wherein the storage battery is disposed in a storage battery recess portion of the floor panel.

6. The vehicle according to claim 1, wherein the storage battery recess portion is disposed in a staged recess portion below front seats such that an upper face of the storage battery substantially coincides with a reference plane of the floor panel.

7. The vehicle according to claim 1, wherein:
    the fuel cell is disposed below the front seats; and
    the storage battery is disposed at a position corresponding to feet of passengers seated in rear seats.

8. The vehicle according to claim 7, wherein the fuel cell is so formed as to be higher than the storage battery.

9. The vehicle according to claim 1, wherein the fuel cell is disposed at a position corresponding to feet of passengers seated in rear seats and the storage battery is disposed below front seats.

10. The vehicle according to claim 9, wherein the fuel cell is so formed as to be higher than the storage battery.

11. The vehicle according to claim 1, wherein the fuel cell and the storage battery are both disposed with their longitudinal directions being coincident with a lateral direction of the vehicle.

12. The vehicle according to claim 11, wherein the fuel cell is so formed as to be higher than the storage battery.

13. The vehicle according to claim 1, further comprising a fuel gas feed unit for supplying the fuel cell with fuel gas, wherein the fuel gas feed unit is disposed below the floor panel so as to be outside the vehicle passenger room.

14. The vehicle according to claim 12, wherein the fuel gas feed unit is disposed behind the rear seats.

15. The vehicle according to claim 1, further comprising a motor for driving at least either front wheels or rear wheels, wherein electric power of at least one of the fuel cell and the storage battery is supplied to the motor.

16. The vehicle according to 1, further comprising fuel cell auxiliaries constituting auxiliaries of the fuel cell, wherein the fuel cell auxiliaries are disposed in a vehicle front room.

17. The vehicle according to claim 1, further comprising fuel cell auxiliaries constituting auxiliaries of the fuel cell, wherein the fuel cell auxiliaries are disposed around the fuel cell.

18. The vehicle according to claim 1, further comprising fuel cell auxiliaries constituting auxiliaries of the fuel cell, wherein the fuel cell auxiliaries are disposed on or below the floor panel.

19. A vehicle comprising:
   a floor panel which separates an inside of a vehicle, which is a vehicle passenger room, from an outside of the vehicle, the vehicle passenger room is equipped with a cooling/heating system; and
   a fuel cell that generates electricity through a reaction of fuel gas and oxidation gas,
   wherein the floor panel has a recess portion which depth is shorter than a height of the fuel cell, and the fuel cell is disposed in the recess portion so that an upper portion of the fuel cell is located above a reference plane of the floor panel on which passenger feet put, so as to be within the vehicle passenger room in a temperature conditioned environment.

20. A vehicle comprising:
   a floor panel which separates an inside of a vehicle, which is a vehicle passenger room, from an outside of the vehicle, the vehicle passenger room is equipped with a cooling/heating system;
   a fuel cell which is disposed on the floor panel and in the vehicle passenger room, and which generates electricity through a reaction of hydrogen gas and oxidation gas; and
   a hydrogen gas tank which is disposed outside of the vehicle passenger room, and which stores the hydrogen gas to be supplied to the fuel cell, wherein the fuel cell is disposed on the floor panel so as to be in the vehicle passenger room in a temperature conditioned environment, wherein the fuel cell is disposed in a fuel cell recess portion of the floor panel.

* * * * *